United States Patent [19]

Storah

[11] Patent Number: 4,777,984

[45] Date of Patent: Oct. 18, 1988

[54] METHOD FOR LINING A PIPE OR MAIN

[75] Inventor: Brian W. Storah, Holmes Chapel, England

[73] Assignee: British Gas plc, London, England

[21] Appl. No.: 13,034

[22] Filed: Feb. 10, 1987

[30] Foreign Application Priority Data

Feb. 10, 1986 [GB] United Kingdom ............. 8603245
Jul. 10, 1986 [GB] United Kingdom ............. 8616817

[51] Int. Cl.$^4$ ............................................. F16L 55/18
[52] U.S. Cl. ..................................................... 138/98
[58] Field of Search ............... 138/97, 89, 98; 264/36, 264/512, 514, 515, 516; 405/154, 155, 157

[56] References Cited

U.S. PATENT DOCUMENTS

| | | | |
|---|---|---|---|
| 3,462,825 | 8/1969 | Pope et al. ........................... | 29/451 |
| 4,233,101 | 11/1980 | Scragg et al. ....................... | 138/97 X |
| 4,273,605 | 6/1981 | Ross .................................... | 138/97 X |
| 4,407,888 | 10/1983 | Crofts ................................. | 138/97 X |
| 4,507,019 | 3/1985 | Thompson ......................... | 138/97 X |

FOREIGN PATENT DOCUMENTS 807413 1/1959 United Kingdom .
2084686 4/1982 United Kingdom .

Primary Examiner—Mark J. Thronson
Attorney, Agent, or Firm—Oblon, Fisher, Spivak, McClelland & Maier

[57] ABSTRACT

A method for lining a pipe or main comprising heating a length of synthetic-resin liner pipe 20 of external diameter substantially equal to or greater than the internal diameter of the pipe or main 40 to be lined, mechanically deforming the heated liner pipe 20 to reduce its external diameter to less than the internal diameter of the pipe or main 40 to be lined, causing the liner pipe 20 to enter the pipe or main 40 to be lined and pressurizing the internal wall of the liner pipe 20 to cause it to expand into engagement with the internal wall of the pipe or main 40 to be lined.

11 Claims, 6 Drawing Sheets

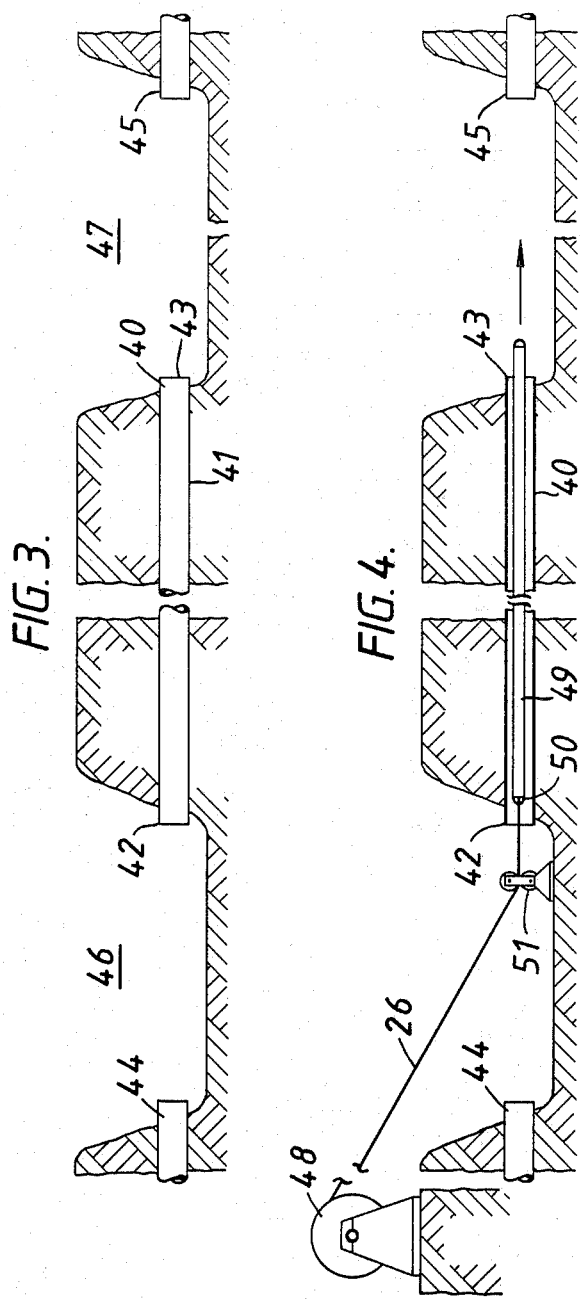

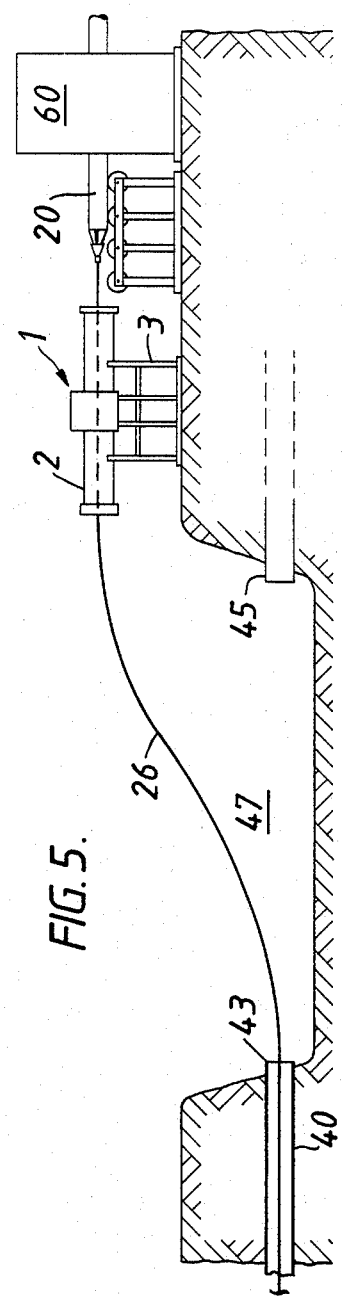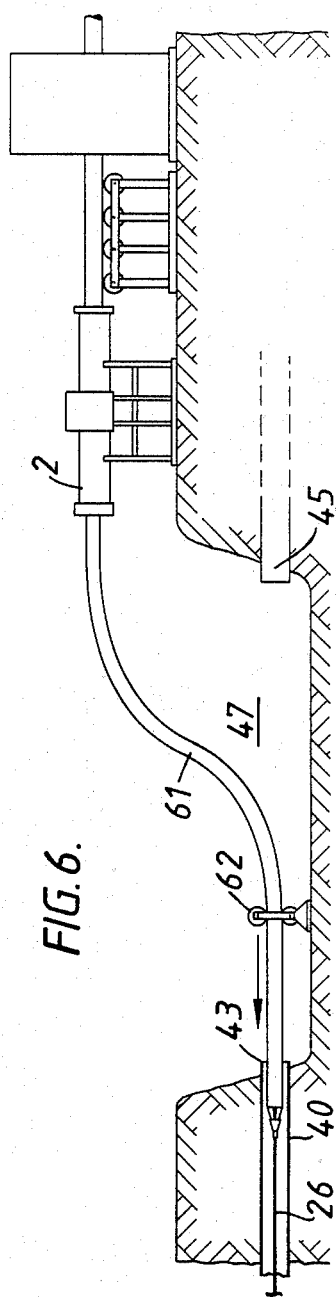

METHOD FOR LINING A PIPE OR MAIN

FIELD OF THE INVENTION

The present invention relates to a method for lining a pipe or main and is particularly directed to the lining of underground gas or water mains or sewer pipes.

BACKGROUND OF THE INVENTION

According to one aspect of the present invention, we provide a method for lining a pipe or main comprising heating a length of synthetic-resin liner pipe of external diameter substantially equal to or greater than the internal diameter of the pipe or main to be lined, mechanically deforming the heated liner pipe to reduce its external diameter to less than the internal diameter of the pipe or main to be lined, causing the liner pipe to enter the pipe or main to be lined and pressurising the internal wall of the liner pipe to cause it to expand into engagement with the internal wall of the pipe or main to be lined.

According to another aspect of the present invention, a closure is provided for closing off the end of a synthetic resin liner pipe during internal pressurisation of the pipe with a pressurising fluid, the closure comprising a cap having a sleeve portion adapted to receive the end of the pipe with clearance and flexible sealing means located within the sleeve and adapted to engage the outer surface of the pipe and form a seal between the outer surface of the pipe and the inner surface of the sleeve portion.

BRIEF DESCRIPTION OF THE DRAWINGS

An embodiment of the present invention will now be particularly described with reference to the drawings in which:

FIGS. 3 to 9 show in schematic form a typical sequence of operations in the lining of a section of an existing main and FIGS. 10 and 11 are longitudinal sections through one form of device for closing the ends of the liner pipe so that it can be expanded by pressurisation, FIG. 10 showing the situation before expansion and FIG. 11 the situation after expansion.

DETAILED DESCRIPTION OF THE PRESENTLY PREFERRED EMBODIMENTS

Figure 1:
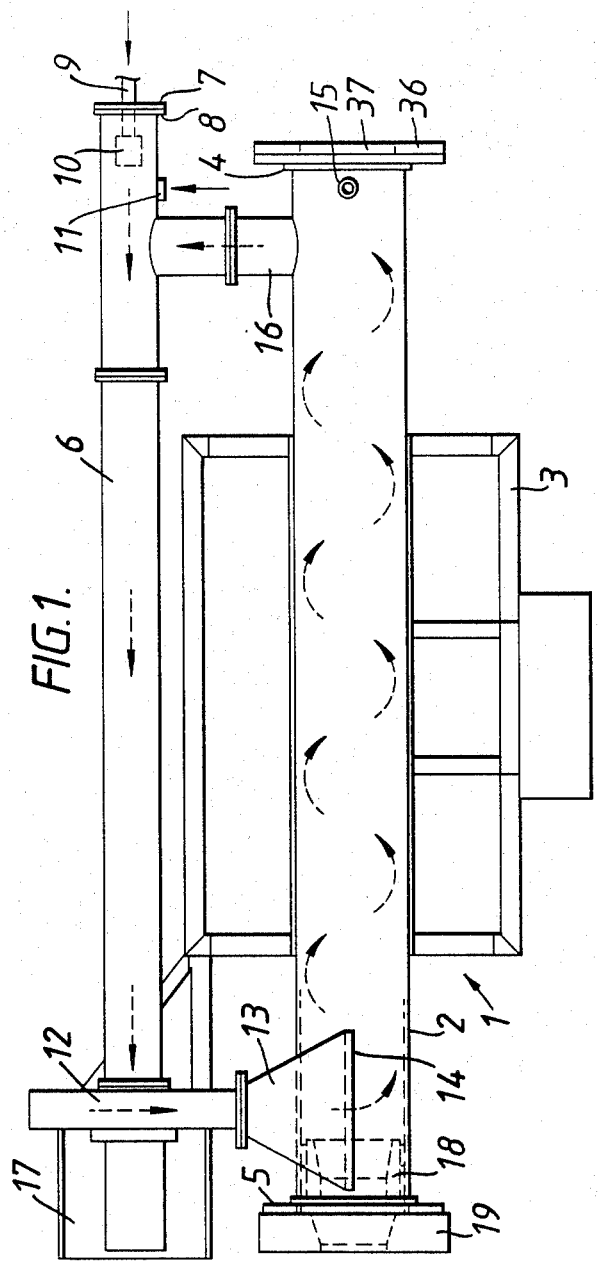
FIG. 1 is a plan view of a rig suitable to preheat and reduce the external diameter of a length of liner pipe.

Referring to FIG. 1, a rig 1 comprises a heater tube 2 which in use is supported above ground on a support frame 3 (see also FIGS. 5 and 6). The tube 2 has a rear end 4 to receive a liner pipe for preheating on passage through the tube 2 and a front end 5 adapted to reduce the external diameter of the preheated liner pipe.

Extending parallel to the heater tube 2 is a smaller diameter tube 6 serving to provide hot gas for preheating a liner pipe within the heater tube 2.

The tube 6 is closed at a rear end 7 by an apertured plate 8 through the aperture of which extends a gas supply pipe 9 for supplying gas to a gas fired burner 10 located within the tube 6. The tube 6 is provided with an air-intake 11 at a point adjacent to the plate 8 to supply air for combustion of the gas within the burner 10.

Hot gas supplied by the burner 10 travels forwardly in the direction of the arrows to an elongated chamber 12 forming the front end of the tube 6. The chamber 12 terminates in a distributor 13 which has a rectangular outlet 14 communicating with a similarly shaped rectangular slot in the wall of the heater tube 2. In this way the hot gas is caused to enter the heater tube 2 from the chamber 12 radially at a point adjacent to the front end 5 of the heater tube 2 taking the direction of the arrows. Once inside the tube 2, the gas travels rearwardly in the direction of the arrows.

Some of the hot gas then leaves the tube 2 by way of an exhaust pipe 15 located adjacent to the rear end 4 of the tube 2. The remaining majority of the hot gas re-enters the tube 6 by way of a radial tube 16 connecting the tubes 2 and 6 at a point adjacent to their rear ends.

The chamber 12 is provided with a circulating fan 17 to cause the circulation of the gas within the assembly to be accelerated.

Figure 2:
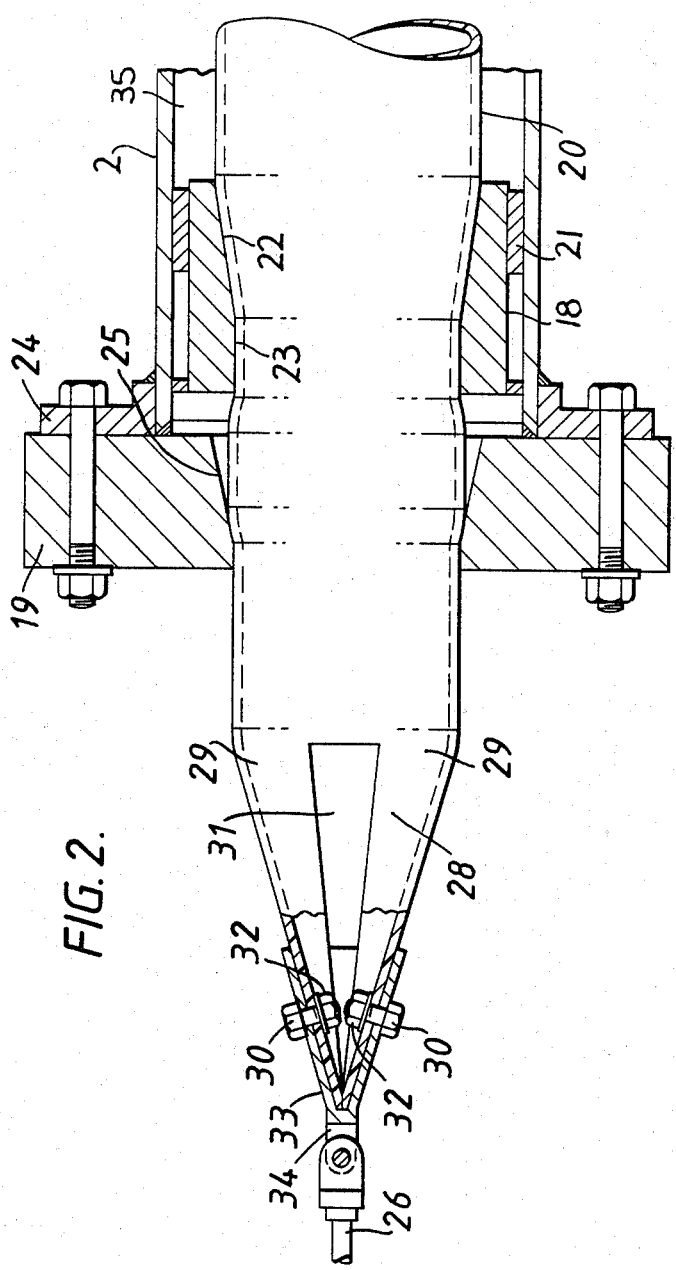
FIG. 2 is a more detailed cross-section of the front end of the rig in use.

Referring to FIGS. 1 and 2 the front ends of the tube 2 is formed by two swaging dies 18 and 19 serving in use to reduce the external diameter of a liner pipe 20 being drawn therethrough.

The first die 18 is located within the tube 2 and is held within a die holder 21 secured to the internal wall of the tube 2. The first die 18 has a forwardly tapering entry section 22 leading to a circular exit section 23. The tapering entry section 22 serves to provide the initial and major proportion of the reduction in the external diameter of the preheated liner pipe 20 as shown in FIG. 2.

The second die 19 is located beyond the end of the tube 2 and is bolted to a circular flange 24 welded to the outer surface of the tube 2. The second die has a forwardly tapering aperture 25 serving to provide a final and minor proportion of the reduction in the external diameter of the preheated liner pipe 20.

In use, the preheated liner pipe 20 is drawn sequentially through the dies 18 and 19 by means of a cable 26 of a winch 48 (shown in FIG. 4). To achieve this, the leading end of the liner pipe 20 is formed in the shape of a cone 28 by cutting the end of the liner pipe 20 into suitably triangular portions 29, folding the portions 29 to form the cone 28 and then welding adjacent portions 29 together. The portions 29 are formed with holes to receive the ends of bolts 30, and gaps 31 are left between the portions 29 so that, when the cone 28 has been formed, the inside of the cone 28 can be accessed manually to place nuts 32 on the ends of the bolts 30. Next a steel cone 33 matching the tip of the pipe cone 28 is placed over the tip of the cone 28 as shown in FIG. 2, the steel cone 33 having holes to correspond with those in the pipe cone 28, and the cones 28 and 33 are bolted together by the nuts and bolts 32 and 30.

The steel cone 33 has an eye 34 which is in use as shown in FIG. 2 connected to the cable 26 of the winch 48.

The internal diameter of the wall of tube 2 is greater than the external diameter of the liner pipe 20 so that an annular space 35 is formed between the outer wall of the liner pipe 20 and the inner wall of the tube 2. In use, the space 35 when the liner pipe 20 is within the tube 2 is enclosed at one end by the internal die 18 and at the other end by a plate 36 having an aperture 37 and being attached to the rear end 4 of the tube 2, the wall of the aperture 37 in the plate 36 forming a close fit with the external wall of the liner pipe 20. Thus, the hot gas entering the tube 2 from the distributor 13 is caused to flow within the enclosed annular space 35 to heat the external wall of the liner pipe 20.

Referring to FIGS. 3 to 9, in the first stage of the lining process (FIG. 3), a section 40 of a main 41 to be lined has ends 42,43 isolated from adjacent portions 44,45 of the main 41. This is done by digging excavations 46,47 at two distant points in the main 41 and then removing pieces from the main 41 to expose the ends 42,43 of the section 40.

In the next stage of the process (FIG. 4), a motorised winch 48 is mounted at ground level adjacent to the end 42 of the main section 40. A stiff rod 49 having an end 50 facing the winch 48 is then pushed along the main section 40 from the end 42 to the end 43. The end 50 of the rod 49 is connected to the cable 26 after the cable 26 has been fed through guide rolls 51 mounted on the floor of the excavation 46. The rod 49 is then pushed completely through the section 40 so that the cable 26 eventually emerges from the end 43 of the section 40.

The cable 26 is then detached from the rod 49 and is fed through the rig 1 as shown in FIG. 5. The cable 26 is then attached to the leading end of the liner pipe 20 in the manner previously described with reference to FIG. 2. Sections of the liner pipe 20 are fed successively to a butt-welding machine 60 located upstream of the rig 1. The machine 60 enables adjoining ends of the pipe liner sections 20 to be butt welded together to form a continuous length. The machine 60 may have facilities for removing both internal and external weld beads from the liner pipe 20 which ideally is of polyethylene.

In the next stage of the process (FIG. 6), the motor of the winch 48 is then actuated to draw the cable 26 towards the end 43 of the section 40 as shown in FIG. 6. This causes the liner pipe 20 to enter the heater 2 through which hot gas is circulating. The liner pipe 20 is then preheated by the gas in the manner previously described to a temperature of about 100° C., and the preheated liner pipe 20 is then drawn through the dies 18, 19 to effect a reduction in the external diameter of the liner pipe 20 (thereby erecting a reduced diameter pipe 61) to an extent permitting the reduced diameter pipe 61 to enter the end 43 of the section 40 by way of guide rolls 62 mounted on the floor of the excavation 47.

Figure 7:
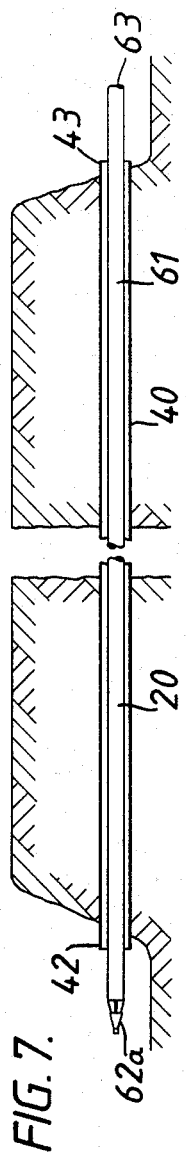

The reduced diameter pipe 61 is then drawn as a continuous length along the section 40 to and out of the far end 42 as shown in FIG. 7. The reduction in diameter of the liner pipe 20 may be of the order of 3% or more.

Figure 8:
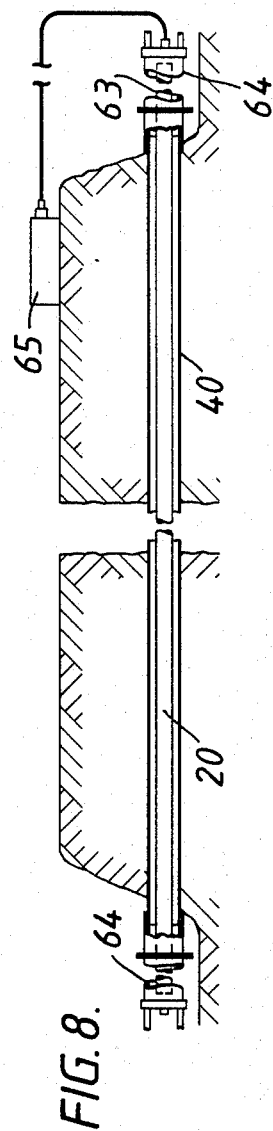
Figure 9:
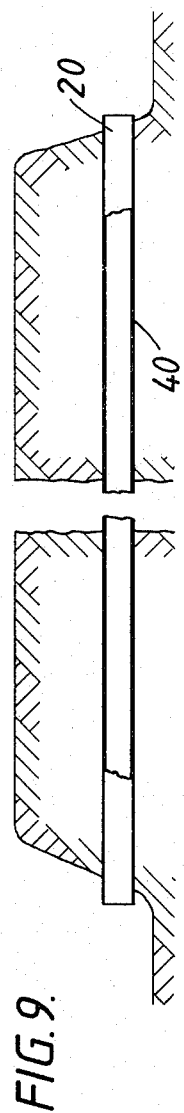

Once the liner pipe 20 has reached and extended beyond the far end 42 of the section 40, the cable 26 is disconnected from the eye 34 on the steel cone 33. The steel cone 33 is then removed from the pipe cone 28, thus leaving the liner pipe 20 with ends 62a and 63 lying exposed beyond the ends 42,43 of the section 40. Both ends of the liner pipe 20 are closed by closures 64, and air is injected into one end of the liner pipe 20 by means of a compressor 65 mounted at ground level adjacent to the end 63 of the main section 40 as shown in FIG. 8. The air is injected at super atmospheric pressure (e.g., 2 to 6 bar) for an extended period (say 24 hours). This causes the liner pipe 20 to expand into contact with the internal wall of the section 40 as shown in FIG. 9.

Figure 10:
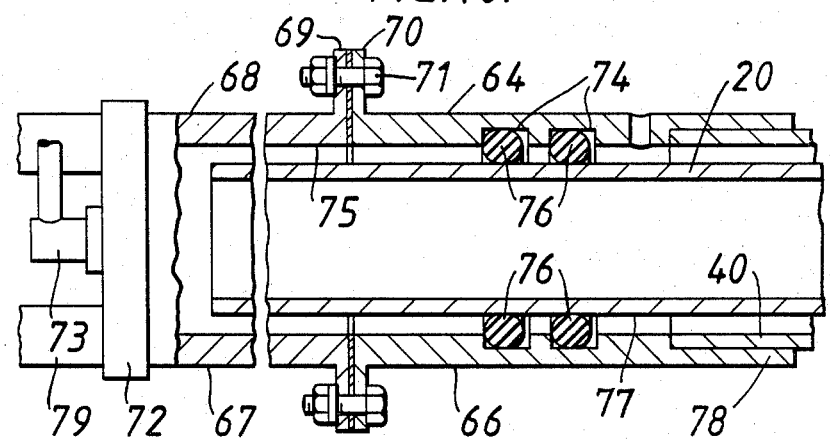
Figure 11:
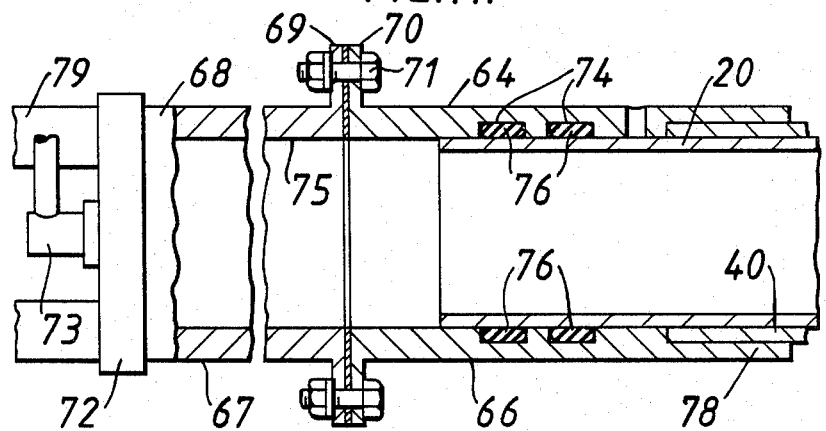

A suitable closure 64 for the liner pipe 20 is shown in FIGS. 10 and 11. The closure 64 comprises a tubular sleeve 66 for receiving one end of the liner pipe 20 and a cap 67 for attachment to the sleeve 66.

The cap 67 has a cylindrical portion 68 having an outwardly flanged open end 69 for connection to a similar outwardly flanged end 70 on the sleeve 66 by means of several nut and bolt assemblies 71 (only two shown). The cap 67 has one end closed by a plate 72 which has a valve 73 which is adapted when open to connect the interior of the closure 64 to the compressor 65 or like device for supplying air under pressure to the closure 64. Alternatively, the valve 73 can be closed when the closure 64 is serving as a seal for preventing the escape of air from one end of the liner pipe 20 when air is being injected at the other end.

Located in two circumferential grooves 74 on the inner surface 75 of the sleeve 66 are two O-ring seals 76 which are arranged to engage the outer surface 77 of the liner pipe 20 when an end of the liner pipe 20 is located within the sleeve 66. The seals 76 form a seal between the outer surface 77 of the liner pipe 20 and the inner surface 75 of the sleeve 66 and permit movement of the liner pipe 20 within the sleeve 66 since the liner pipe 20 expands radially and contracts longitudinally as pressure is applied to the interior of the liner pipe 20.

In use, both the exposed ends of the liner pipe 20 are closed with a closure device 64. The sleeve 66 may have a recessed end portion 78 to fit over the corresponding end 42, 43 of the main section 40 as shown in FIGS. 10 and 11. Each closure 64 is supported against the internal walls of the excavation by means of struts 79 extending outwardly from the cap 67 to prevent its being blown off during pressurisation of the closure 64. One of the closure devices 64 is connected to the compressor 65 by means of the valve 73, which is opened. The valve 73 of the other closure 64 is closed. Air is then supplied by the compressor 65 to pressurise the liner pipe 20. After use, the closures 64 are removed, and the ends of the liner pipe 20 are connected up to the adjacent portions 44 and 45 of the main 41 by conventional means.

The pressurisation of the liner pipe may form part of a standard pressure test to test the soundness of the liner pipe 20.

I claim:

1. A method of lining an underground pipe or main, said method comprising the steps of:
    (a) preheating a length of synthetic-resin liner pipe of external diameter substantially equal to or greater than the internal diameter of the underground pipe or main to be lined;
    (b) drawing the so-heated liner pipe into the underground pipe or main to be lined by way of at least one swaging die dimensioned to reduce the external diameter of the liner pipe to less than the internal diameter of the underground pipe or main to be lined; and
    (c) pressurizing the internal wall of the liner pipe to cause it to expand into engagement with the internal wall of the underground pipe or main to be lined.

2. A method as claimed in claim 1 in which the liner pipe is preheated by means of a portable heating device.

3. A method as claimed in claim 2 in which the portable heating device comprises a heating chamber through which, in use, the liner pipe is drawn.

4. A method as claimed in claim 3 in which the heating chamber includes the at least one swaging die.

5. A method as claimed in claim 1 in which the liner pipe is drawn into the underground pipe or main to be lined by means of a cable attached to the leading edge of the liner pipe.

6. A method as claimed in claim 5 in which the cable is wound onto the drum of a motorized winch to draw the liner pipe into the underground pipe or main to be lined.

7. A method as claimed in claim 1 in which a succession of lengths of synthetic-resin pipe are butt-welded together to obtain the liner pipe.

8. A method as claimed in claim 1 in which the internal wall of the liner pipe is pressurized at superatmospheric pressure.

9. A method as claimed in claim 8 in which the internal wall of the liner pipe is pressurized with air.

10. A method as claimed in claim 1 in which both ends of the liner pipe are closed with closures to enable the internal wall of the liner pipe to be pressurized.

11. A method as claimed in claim 1 in which the synthetic-resin is polyethylene.

* * * * *